United States Patent [19]
Herlitzius et al.

[11] Patent Number: 5,775,072
[45] Date of Patent: Jul. 7, 1998

[54] PROCESS FOR AUTOMATICALLY CONTROLLING A CROP PROCESSING UNIT

[75] Inventors: Thomas Herlitzius, Dellfeld; Lutz Bischoff, Dresden, both of Germany

[73] Assignee: Deere & Company, Moline, Ill.

[21] Appl. No.: 602,474

[22] Filed: Feb. 16, 1996

[30] Foreign Application Priority Data

Feb. 22, 1995 [DE] Germany ............ 195 06 059.8

[51] Int. Cl.$^6$ ............ A01D 75/00; A01F 12/00
[52] U.S. Cl. ............ 56/10.2 R; 460/4; 460/7
[58] Field of Search ............ 56/10.2 R, 10.2 A, 56/10.2 B, 10.2 C, 10.2 G; 460/4, 5, 6, 7

[56] References Cited

U.S. PATENT DOCUMENTS

| | | | |
|---|---|---|---|
| 3,935,866 | 2/1976 | Northup et al. | 460/4 |
| 4,259,829 | 4/1981 | Strubbe | 56/10.2 |
| 4,360,998 | 11/1982 | Somes | |
| 4,466,230 | 8/1984 | Osselaere et al. | 460/5 |
| 4,934,985 | 6/1990 | Strubbe | 460/4 |

FOREIGN PATENT DOCUMENTS

| | | |
|---|---|---|
| E 29 845 B | 6/1983 | Austria . |
| B1-0 339 140 | 11/1989 | European Pat. Off. . |
| B1-0 339 141 | 6/1995 | European Pat. Off. . |
| A-27 53 505 | 6/1979 | Germany . |
| 29 19 531 A1 | 1/1980 | Germany . |
| 30 03 308 C1 | 8/1982 | Germany . |
| C2-29 03 910 | 7/1987 | Germany . |
| 40 09 981 A1 | 10/1991 | Germany . |
| C-44 25 453 | 9/1995 | Germany . |

*Primary Examiner*—Terry Lee Melius

[57] ABSTRACT

Ideal function curves are generated for a combine in various operating conditions having acceptable loss rates. These ideal function curves are stored in an onboard computer and compared with actual measured function curves. The actual function curves are derived from sensors measuring grain distribution per linear length of grain falling through the sieve. The computer compares the actual function curve with the ideal function curve for transmitting an adjustment signal to the appropriate controller to drive the actual function curve towards the ideal function curve. Loss sensors are not required because acceptable losses for various conditions are built into the ideal function curves.

4 Claims, 3 Drawing Sheets

PROCESS FOR AUTOMATICALLY CONTROLLING A CROP PROCESSING UNIT

BACKGROUND OF THE INVENTION

1. Field of the Invention

The invention is directed to a process for automatically controlling at least one crop processing unit in a harvesting machine.

2. Description of the Prior Art

Currently combines operated by custom harvesters are operated at extremely high harvesting capacities. This harvesting capacity can only be attained, if such a combine is optimally adjusted. The sieve aperture, the blower output, the degree of threshing, must be adjusted to lead to the maximum possible threshing, the least possible amount of straw and chaff output, the least possible loss of grain, the highest possible degree of grain cleanliness and the fewest possible damaged kernels. Since these adjustments are dependent upon the particular variety of crop, crop condition, the operating condition of the combine and other factors, there is no single correct adjustment, but rather, an unending multitude of adjustment combinations, among which the correct one must be found at any given time. It is impossible for an operator to optimally update these adjustments at all times and at the proper time.

It is therefore known (EP-B1-0 339 141, EP-B1-0 339 140, DE-C2-29 03 910) to perform adjustments on combines automatically. For this purpose, loss sensors can be used to determine in relative or absolute terms, how much grain is deposited on the ground from the separating or the cleaning arrangement of the combine. This loss information can be used to vary the flow of the crop over the cleaning arrangement, the blower output, the total throughput of the machine and the like. According to U.S. Pat. No. 4,360,998 instead of loss sensors, the loss is calculated by a function extrapolated beyond the end of the sieve from the screening performance of the grain sieve.

Under these known methods and devices the determination of a grain loss is critical. However the grain loss is difficult to establish in relative as well as in objective terms, as the values determined reproduce the actual losses precisely over a small region. It is equally detrimental that after such a procedure, the control process is initiated only at the last possible point in time, that is, when the separating and cleaning process is completed. At this point in time, completely different conditions may exist over the sieves, for which the values determined from the grain losses are no longer valid.

A further problem in the formation of absolute mass values lies in the fact that the measurement system must first be calibrated, before a calculation of the actual mass is possible.

SUMMARY

It is an object of the present invention to provide an automatic control process which adjusts a cleaning shoe at an early point in time without a determination of grain loss.

With the present invention only process parameters are measured, that permit a determination of the quality of the current processing operations without any recalculation to a mass value. It is not necessary to determine the actual mass flow through, the sieves or the chaffer, but the relationship between the measured values at various measurement points is sufficient. It is significant, however, that measurement values are sensed over the entire crop flow. Since measurement values from the sensors distributed over the entire crop flow are compared to each other, influences such as humidity, grain size, degree of cleanliness and the like have no effect since these are sensed equally by all sensors and hence cancel each other out. Finally, determinations of value are available to establish operating performance of the various components using values of the cleaning operation in connection with the coordinates of the cleaning surface.

With these cleaning values equalized or approximated, functions are calculated for which the sensors provide support points. Single or multiple differentiation of the functions over an axis of the cleaning surface, or over time, results in useful evaluations over the location and timing of the cleaning. The differentiation establishes the shape of the function and the influence of constants and coefficients of lower order is eliminated. The function displays certain characteristics, for example, the location of the extreme values, the slope and interval of the length or the time, the points of reversal and the length of arc. If the ideal cleaning function is compared to the current actual cleaning function, detected information and adjustment values can be derived from the evaluation of the current deviation, that are able to optimize the actual shape of the function in one or more characteristics. By correlating the course of the signals over time of the cleaning devices among each other it is possible to calculate the actual running time of the mass flow between the individual operating devices. Such cleaning functions can be derived for the crop flows under the straw walkers as well as under the sieves and under the threshing concave.

The cleaning shoe should be understood to include not only the sieves and the chaffer; it can also include the straw walkers that are affected by threshing values or throughput.

DETAILED DESCRIPTION

Figure 1:
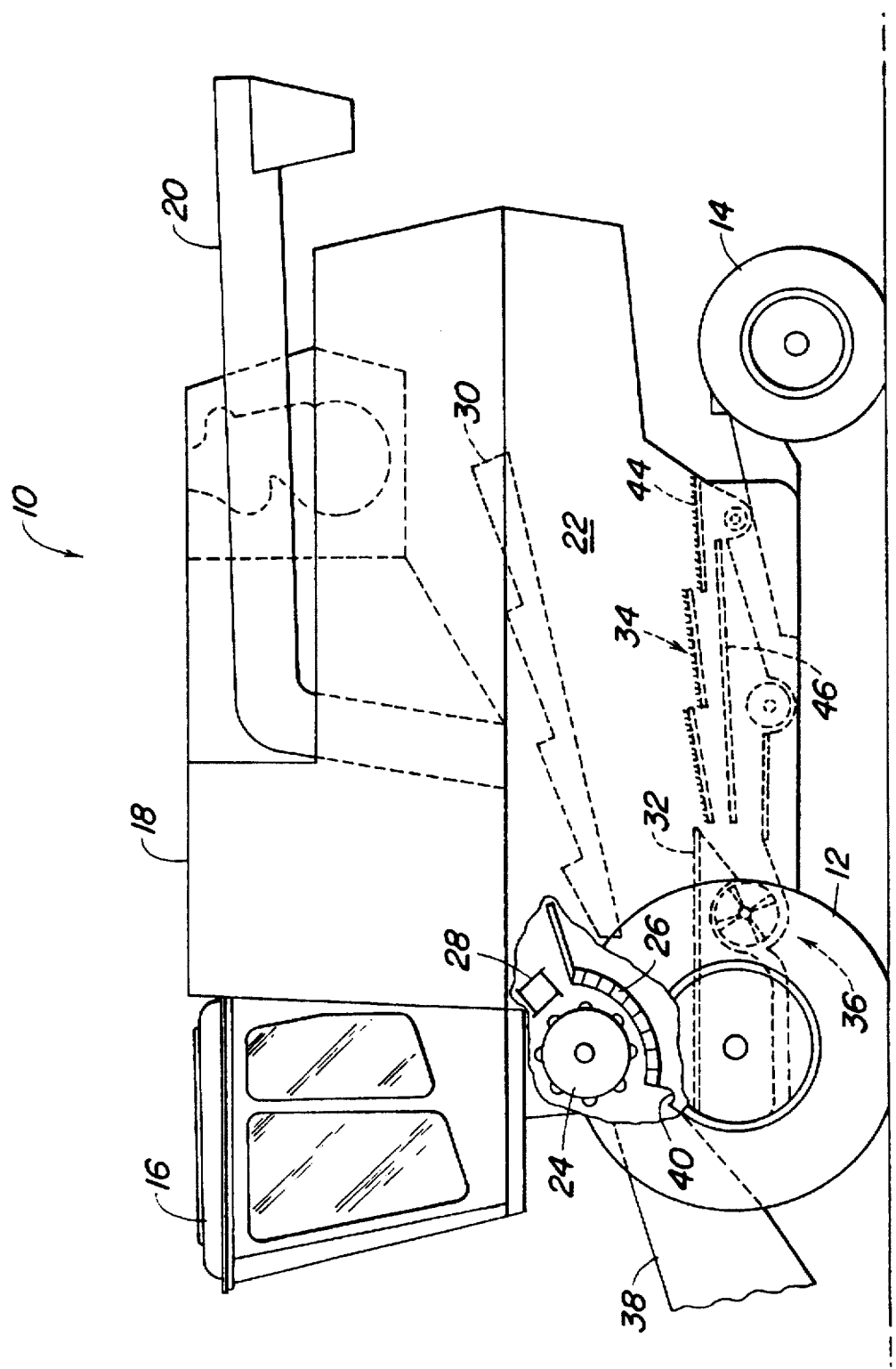
FIG. 1 shows a harvesting machine operated according to the process of the invention.

FIG. 1 shows a harvesting machine 10 in the form of an agricultural combine that is supported on forward driven wheels and rear steerable wheels 12 and 14. The harvesting machine 10 is provided with an operator's cab 16 from which it can be controlled by an operator. The present invention can be used on a stationary threshing machine, an experimental threshing installation or the like. A grain tank 18 is located behind the operator's cab 16. The grain tank 18 is provided with an unloading auger 20 for unloading clean grain from the tank. The grain tank 18 is supported on a frame 22.

A harvested crop is directed by feederhouse 38 past stone trap 40 to a transverse threshing cylinder 24 and associated concave 26. The threshed crop is then directed by beater 28 to straw walkers 30. Grain and chaff falling from the concave 26 and the straw walkers 30 is directed to grain pan 32. The grain pan 32 in turn directs the grain and chaff to cleaning shoe 34. The cleaning shoe 34 comprises a series of sieves 44 and chaffers 46 through which air is blown by blower 36. In the cleaning shoe 34 the grain is separated from the chaff and the clean grain is directed to the grain tank 18. The lighter chaff is blown out the rear of the combine by the blower 36. The heavier straw components are thrown out the rear of the combine by the straw walkers 30. The harvesting machine 10 can be a conventional combine as illustrated in FIG. 1, or a rotary combine, or a combine having another configuration.

Harvesting machine 10 is provided with adjustment devices, not shown, for the controlling of the gap between threshing concave 26 and cylinder 24, the circumferential speed of the threshing cylinder 24, the width of the opening of the sieves in the cleaning shoe 34, and the air flow delivered by the blower 36. These adjustment devices are provided with electrically controlled servo motors and are used to operate the harvesting machine 10 at optimum conditions. Optimum operation of the harvesting machine 10 is understood to require adjustments with which the harvested crop is processed and separated into its individual components (clean grain, straw, chaff) in such a way that the highest possible output per unit of area, a maximum amount of clean grain, is obtained. In order to attain this optimum operation a certain relationship must be maintained between the mechanical processing of the crop (threshing), the width of the sieve opening, and the blower output depending upon the crop variety, condition of crop, degree of cleanliness, vehicle speed, slope inclination and other factors. Since the aforementioned conditions can often change even in a single field, it is necessary to change the current adjustments to comply with the current conditions.

Air flow through the cleaning shoe is fundamentally controlled by the rotational speed of the blower 36. Air flow represents a significant factor in determining cleanliness of the grain, and in determining grain losses. The illustrated embodiment concentrates on varying the rotational speed of the blower 36. For this purpose, the blower 36 is driven by an infinitely variable belt drive, not shown, that is adjusted by an electric motor.

The speed of the blower is controlled by an adjusting signal. By automatically controlling the speed of the blower, the mass of the crop located on the cleaning shoe 34 experiences an optimum separation into clean grain and chaff, thereby achieving a high degree of cleanliness and low grain losses.

Figure 2:
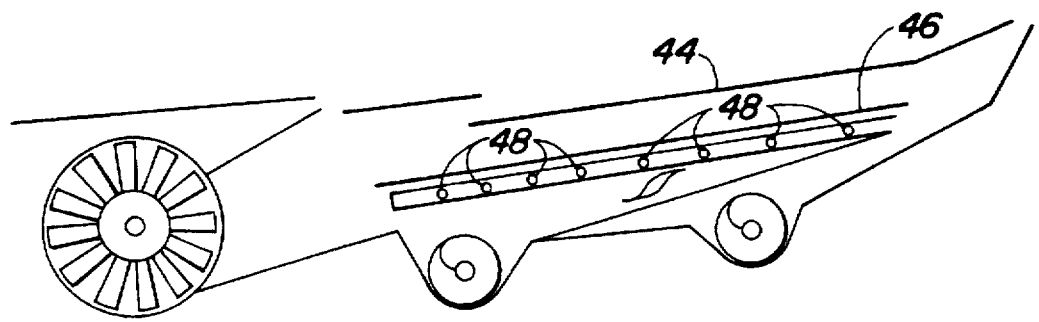
FIG. 2 shows a schematic side view of the cleaning shoe of the harvesting machine with several sensors.

Sensors 48 are arranged, as shown in FIG. 2, beneath chaffer 46. These sensors maybe formed in a rod-shaped configuration and arranged in such a way that they generate signals that correspond to the mass of crop falling through openings in the chaffer 46. For this purpose at least two, but preferably a multitude of sensors 48 are arranged in the direction of the crop flow. It is advantageous if the sensors 48 encompass a significant part of the width of the crop flow. These sensors 48 are connected by cables or through radio signals to at least one computer.

Deviating from or in addition to this embodiment, similar sensors 48 may also be provided at other locations that underlie the crop flow, for example, under the threshing concave 26 and/or under the straw walkers 30.

Sensors 48 detect the mass of clean grain falling from chaffer 46. The amount of clean grain is dependent upon the air flow delivered by the blower 36 and the size of the openings in the chaffer 46. Grain loss sensors of known design may be provided at the end of the cleaning shoe 34 in order to establish the ideal function 50 and which transmit a qualitative signal for the mass of the grain that the harvesting machine 10 leaves on the ground. It should be noted, that the invention does not have the goal of determining the grain losses, but that the grain loss sensors are intended to simplify the task of finding an optimal adjustment in the establishment of the ideal function. For the operation of the harvesting machine 10 grain loss sensors are not required once the ideal function 50 has been defined.

Moreover for the initial establishment of a necessary series of measurements the proportion of the so-called carry-over can be determined. In addition, for the determination of the exact grain losses a counting and weighing of the grain on the ground can take place, which can be performed in addition to or instead of the evaluation by the grain loss sensors.

Figure 3:
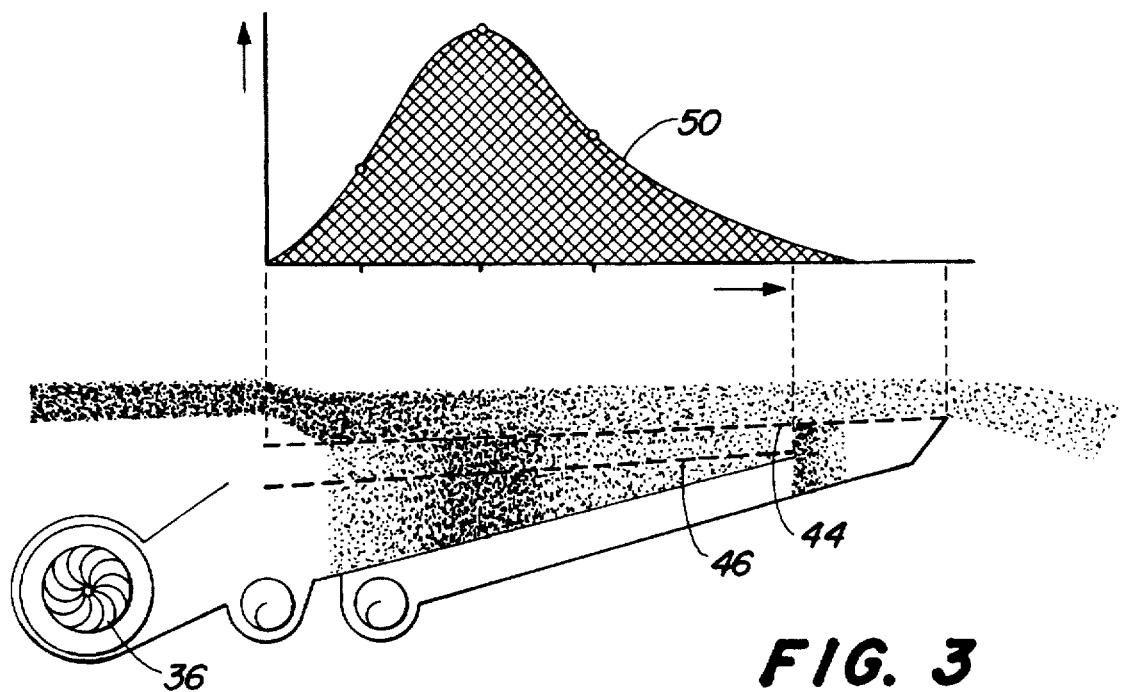
FIG. 3 shows a graphical illustration of the shape of an ideal function of the cleaning flow with respect to the operating components.

After the sensors 48 have been installed and connected to a corresponding computer, the harvesting machine 10 is put into threshing operation. During the threshing operation a multitude of measurement data sets are generated from the signals of the sensors 48 while maintaining an ideal adjustment, so that a relationship can be established between the mass of the grain passing through the cleaning shoe and its variation over the length of the chaffer, which could appear graphically as illustrated in FIG. 3. As can be seen in FIG. 3, the trend of the curve, which is a graphical representation of the ideal function 50, results from a multitude of supporting points each of which represents the measured value of a multitude of sensors 48. This relationship can be expressed mathematically as the ideal function 50 and is identified by function characteristics that remains constant under all harvesting conditions with a particular location of inflection points, a particular slope and a particular position of the maximum point.

In order to more easily manipulate the ideal function 50, a summing function 52 is generated for it, which can be expressed by the equation:

$$Y = A * e^{(B*h)} \text{ where } h = e^{(C*x)}$$

Figure 4:
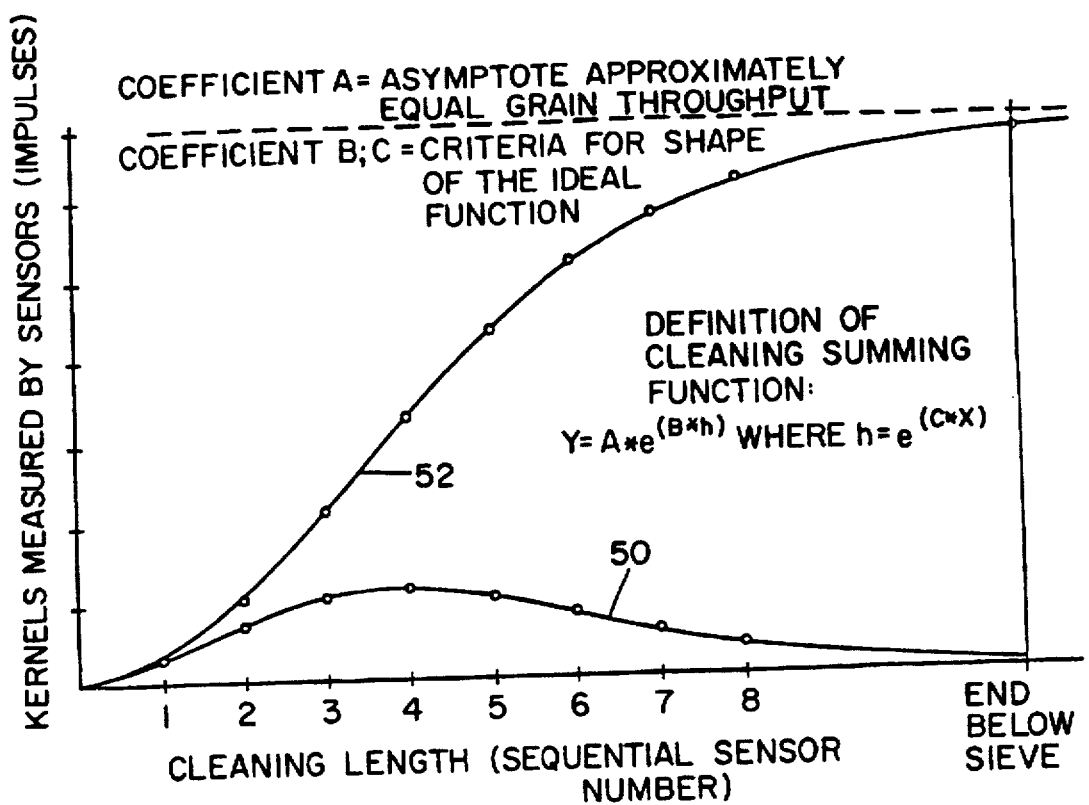
FIG. 4 shows a further graphical illustration of the shape of an ideal function with a summing function.

In FIG. 4 the ideal function 50 is the lower curve and the summing function 52 is the upper rising curve. The ideal function 50 represents an ideal cleaning function and the summing function 52 represents a summing cleaning function.

In the summing function 52, whose generation is not necessary but is advantageous for the further processing, the symbols represent:

Y the mass of the crop as detected screened through the chaffer 46;

X the screening length, that is, the length of the path covered by the crop along the cleaning shoe 34, in particular on the chaffer;

A a coefficient that has a relationship to the entire throughput of grain through the harvesting machine 10;

B,C coefficients that have a relationship to the rotational speed and thereby to the output of the blower 36.

According to the typical ideal function 50 or its graphical representation as a curve, this has its maximum approximately at the transition between the first third and second third, and flattens out in the last third. In the summing function 52 this region is characterized by the largest increase. When the entire mass flow is increased, it is shown by a change in the coefficient A, the characteristic shape of the curve of the function does not change, but only its position in the diagram.

It should be noted that the ideal function so determined is valid for harvesting machines of the same design while for harvesting machines of other designs other ideal functions are valid.

Preferably the determination of the coefficients of the summing function 52 from a measured distribution of material is programmed as algorithm in a computer program and the computer program is supplied as input to a computer. Although it is possible to integrate the algorithm into hardware, in the present embodiment a software solution is preferred since this can be maintained more easily and is more flexible for future operating conditions. The computer is installed as small computer in the region of the operator's cab 16. However, it is also possible to transmit the corresponding data wireless by radio to a remote computer which can be operated from the operator's cab 16.

The computer is equipped with an operating unit with which particular threshold values can be controlled and from which guidelines can be derived, such as allowable grain losses, control limit values, volume of throughput, vehicle speed and the like. As a rule allowable values can be controlled from the outside and are represented as threshold values.

The sensors 48 are connected to the input of the computer which accepts the signals resulting from the mass of the grain cleaned by the chaffer 46 where these may be digitized either inside or outside the computer. The computer is preferably a programmable small computer. However, a simple conventional analog or digital summing device or the like may be used instead. In distributed measurement intake systems, instead of a single computer, a master-slave computer combination could be used.

The computer or, if applicable, the master computer has a control output leading to the drive of the blower 36 and through a corresponding output signal may increase or decrease the rotational speed of the blower 36.

Since the curve according to the ideal function 50 as well as that according to the summing function 52 are known on the basis of the prior determinations in its qualitative characteristics, which are described for the course of the summing function 52 by the coefficient B and C, a momentary curve defined by all sensor measurement values at a particular point in time or the actual course of the function can be transmitted to the algorithm for the determination of the coefficients, which calculates the coefficients A, B and C for the momentary curve. The momentary coefficients B and C are now actual values, which can be compared with the control input (known coefficients B and C), in order to control a control deviation. An operator may intervene here by changing the allowable deviations of known coefficients B and C whereby the changed process conditions are tolerated more or less strongly. Due to the possibility of estimating the curve from a few support points, considerably more sensible characteristics are given with the coefficients B and C compared to the loss measurement afflicted by measurement errors, at a time earlier than with a loss measurement a goal-directed intervention is possible and all quality characteristics of the cleaning process (loss, cleanliness, carry-over load) can be affected. The coefficient A thereby remains variable since it is dependent purely on throughput. If a variation of the momentary function from the ideal function can no longer be controlled by the blower (or in the sieve gap) or if this type of control is not desired, then another approximation, although a somewhat coarser approximation, to the ideal function can be performed by a change in the throughput.

Herein lies the basic difference from the conventional control system, which initially measure the grain losses in absolute terms. The grain loss, however, is only of subordinate interest, since it gives only a limited picture of the current load on the harvesting machine 10 and the measurement of the grain loss is highly error-prone.

According to the process under the invention there is a constant comparison between the optimum and the current shape of the curve, that is, the ideal and the actual shape of the curve, over the comparison of the mathematically, according to the algorithm, determined values. The shape of the curve here is understood to be the totality of the measured values of a cycle of data acquisition which can be represented in its simplest form in the two-dimensional representation in a curve in a diagram. During the calculation of the control differential the shape of the curve is formed by processable data. Since a change in the parameter -A- has no substantial effect on the peculiarities of the curve or the function, but only on its position, when there is a deviation of the actual values from the target values a change may be limited to its effect upon the coefficients -B- and -C-. Since the coefficients -B- and -C- each for itself, but also in a mathematical relation to each other, either as product or as sum, have a relationship to the output of the blower 36 (or to the result of the cleaning operation) these can be changed by means of an adjustment signal from the computer to the infinitely variable belt drive of the blower and thereby the course of the actual function may be changed to comply more closely to the course of the ideal function 50. Through a further comparison performed shortly thereafter it could be established whether the direction of the change in the blower output has led to the desired result; this is not absolutely necessary, since the result of the comparison between the target and actual values contains the direction not the amount of the necessary change to the blower. This correcting variable in one direction remains active until the blower rotational speed has changed so much that the resulting shape of the actual function has again approached the shape of the ideal function 50 - whereby the comparison of target minus actual comparison has the result of zero, which then signifies "zero" direction (that is, a rest condition). This results in an independence from the adjusting characteristic of the blower 36; however, in subsequent algorithms safety inquiries must be made, if the controller does not have a stop.

From the comparison of target value (from which the control value was derived) and actual value (when this is a necessarily modified control value) the control deviation is formed ($X_W$=actual–target) $X_W$ is the input signal of the controller, which forms a control value. The control value is (modified and amplified, if necessary) the intrusion into the process in order to close the control loop.

It should be noted that for various values of throughput, if applicable also for measurement errors or other effects there are a number of the ideal function 50 curves of equal shape, where a part of the coefficients B, C describes the series of courses of ideal function only their form and not or very little in the throughput. Then the series of functions is associated with a corresponding series of coefficients that can be separated into varying coefficients for all functions and (almost) constant coefficients in all functions of the series. A constant coefficient is a machine constant once determined that remains equal over all conditions and grain varieties at optimum operating quality.

We claim:

1. Process for the control of a crop processing unit in a harvesting machine (10) with the following process steps:
   a) creating an ideal function curve (50) from measured values determined under optimum cleaning conditions of the harvesting machine (10) during an actual cleaning operation, the ideal function curve being a function relating clean grain throughput of the cleaning system to longitudinal distance in the cleaning system;

b) generating an algorithm describing the ideal function curve (50) having at least two coefficients (B, C) where the coefficients (B, C) is associated with a control variable that influences a cleaning operation;

c) programming a computing device with the algorithm;

d) during the operation of the harvesting machine (10) forming measurement values over the course of the cleaning process and determining the actual function curve;

e) comparing the actual function curve to the ideal function curve;

f) in case of a deviation in the actual function curve from the ideal function curve (50) changing a control variable that influences the coefficients to arrive at a closer approximation of the actual function curve to the ideal function curve (50).

2. Process according to claim 1, wherein the ideal function curve and the actual function curve are generated with a summing function.

3. Process according to claim 2, where the summing function (52) is:

$$Y = A * e^{(B*h)} \text{ where } h = e^{(C*x)}$$

wherein Y being clean grain throughput, X being the longitudinal distance in the cleaning system, A being a coefficient related to grain throughput, B,C being coefficients related to the output of a blower in the cleaning system.

4. Process according to claim 3, wherein the comparison of the shape of the ideal and the actual function curves is performed on the basis of the coefficients (B, C) by means of a software controlled computer.

* * * * *